April 27, 1948.　　　B. W. BENBOW　　　2,440,598
MOLDING MACHINE
Filed Dec. 20, 1944　　　4 Sheets-Sheet 1
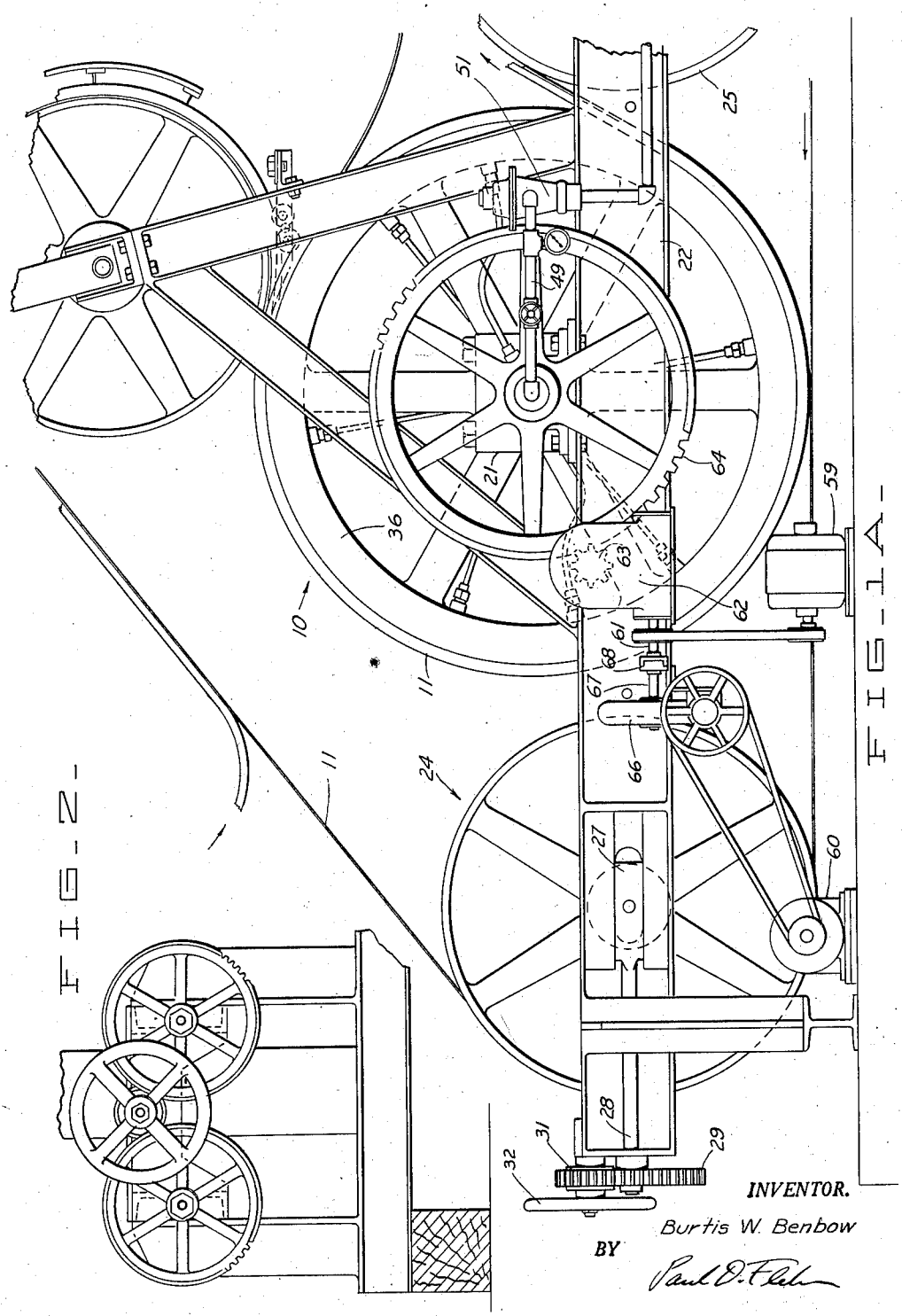
INVENTOR.
Burtis W. Benbow
BY

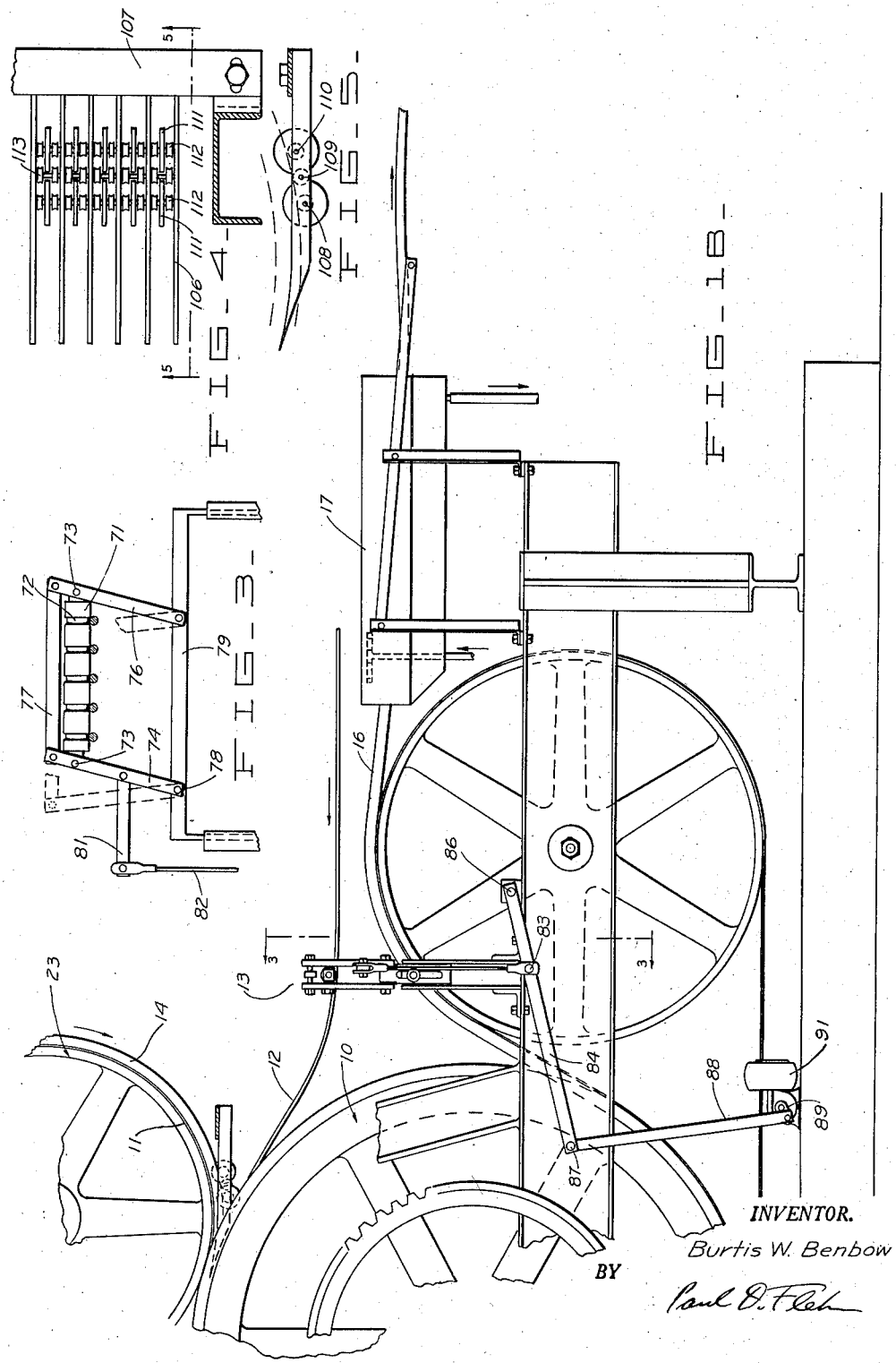

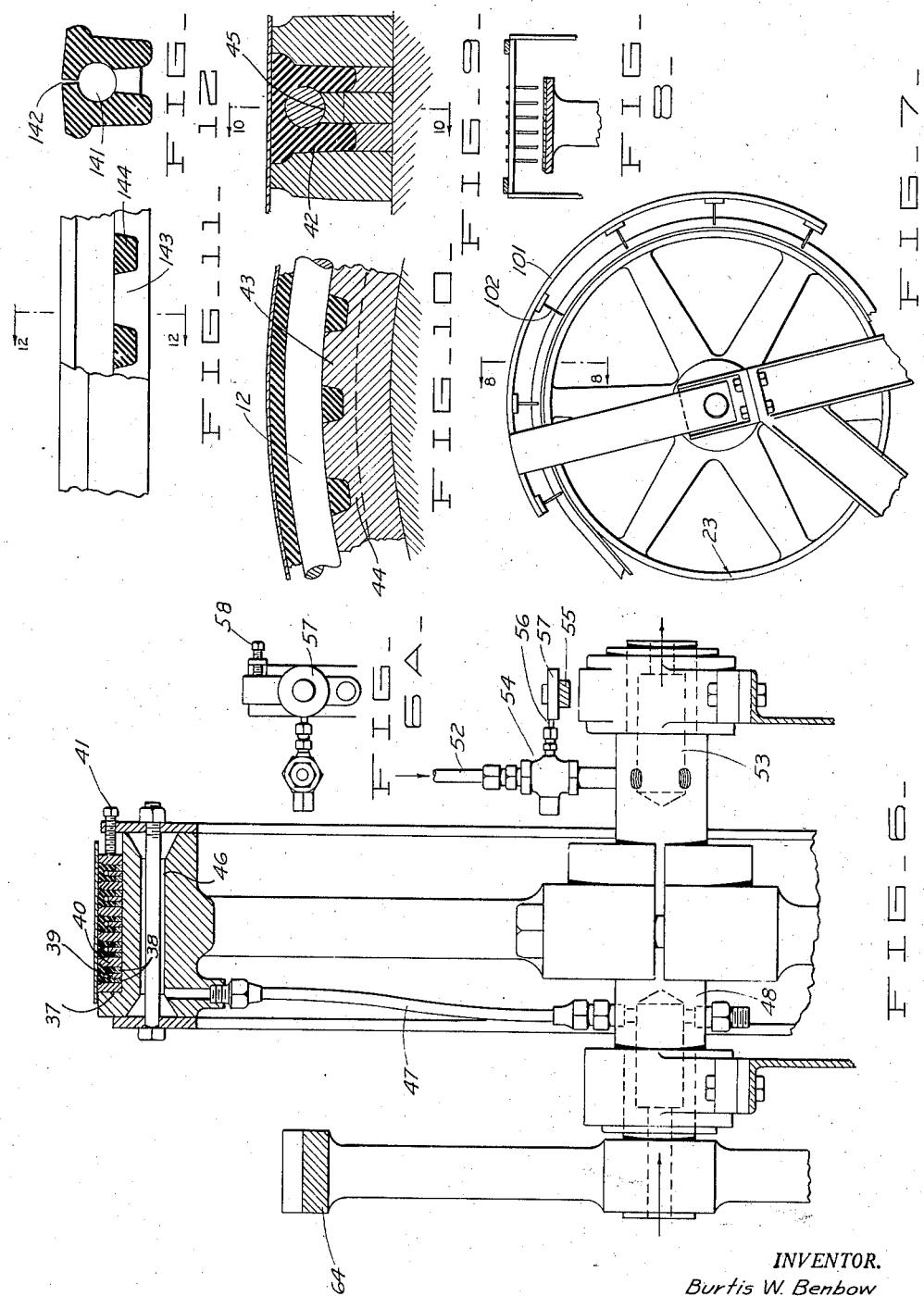

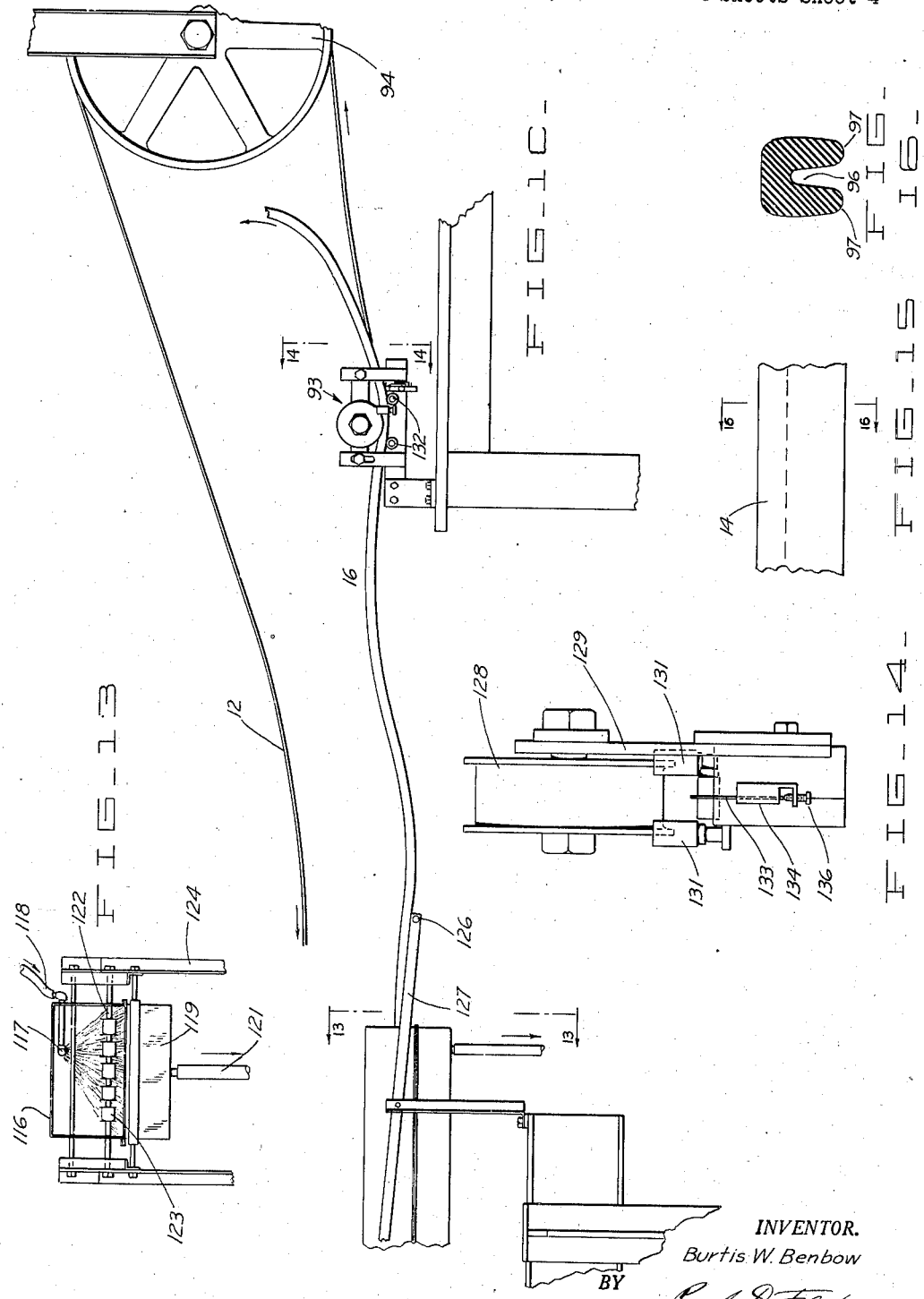

Patented Apr. 27, 1948

2,440,598

UNITED STATES PATENT OFFICE 2,440,598

MOLDING MACHINE

Burtis W. Benbow, Benbow, Calif.

Application December 20, 1944, Serial No. 568,999

11 Claims. (Cl. 18—6)

This invention relates generally to machines and methods for continuously molding products from material like resilient natural or synthetic rubber, and including particularly insulating sheaths suitable for electrical trolley wires or conductors.

In the past it has been proposed to protect trolley wires or conductors by use of sheaths of insulating material, thereby precluding accidental electrical contact. Particularly in my Patent No. 2,255,874 there is disclosed an insulating sheath having spaced openings in one side of the same, and adapted to be used with a traveling contacting device having a series of spaced conducting teeth which are adapted to enter the spaced openings in the insulating sheath for a continuous connection with the trolley conductor. The present invention is particularly concerned with a machine and method for continuously forming such insulating sheaths.

Particular objects of the invention can be briefly stated as follows: To provide a machine which will carry out the molding operation continuously with resilient materials such as rubber or equivalent synthetic substances; to provide means for properly locating and centralizing a wire within the molding cavity, whereby a passage will be properly formed longitudinally of the sheath to accommodate a conductor; to enable proper feeding of rubber stock to the mold whereby the desired form of the finished product is maintained; to provide a machine which will prevent undue deviations from a desired dimensioning in the final product; and to provide a machine and method wherein the molded sheath is continuously stripped away from the inner wire whereby the wire is returned to the machine and reused continuously.

Another object of the invention is to provide a machine and method which makes possible continuous molding of products from a strip of rubber stock or like material, and which enables quantity production with a minimum amount of labor.

Further objects and features of the invention will appear from the following description in which the preferred embodiment has been set forth in detail in conjunction with the accompanying drawing.

Referring to the drawing:

Figures 1a, 1b and 1c, taken together, left to right, illustrate portions of the machine in side elevation.

Figure 2 is an end view showing means for adjusting the tension upon the endless metal belt employed.

Figure 3 is an enlarged detail illustrating means for oscillating the wire as it is fed to the molding cavity.

Figure 4 is a plan view, on an enlarged scale, showing means employed for crowding the rubber stock into the molding cavity.

Figure 5 is a cross sectional view taken along the line 5—5 of Figure 4.

Figure 6 is a cross sectional detail taken on an enlarged scale, showing the construction of the molding wheel.

Figure 6a is a detail showing means for operating the condensate valves.

Figure 7 is a side elevational detail, showing the upper idler wheel of Figure 1a, together with parts associated with the same.

Figure 8 is a cross sectional detail taken along the line 8—8 of Figure 7.

Figure 9 is a cross sectional detail on an enlarged scale showing the rubber stock in a molding cavity during the molding and curing operation.

Figure 10 is a cross sectional view taken along the line 10—10 of Figure 9.

Figure 11 is a side elevational view, partly in section, showing the finished molded product.

Figure 12 is a cross sectional view taken along the line 12—12 of Figure 11.

Figure 13 is a cross sectional view of the chilling means employed to rapidly cool the sheath leaving the molding wheel.

Figure 14 is an enlarged detail taken along the line 14—14 of Figure 1c.

Figure 15 is a detail view in side elevation showing rubber stock such as is suitable for use with my machine.

Figure 16 is a cross-sectional view taken along the line 16—16 of Figure 15.

In general the machine as illustrated in the drawing consists of a molding wheel 10, which is rotated at a predetermined speed, and which has an endless band 11 applied under tension to a portion of its periphery. The wire or cable 12 about which the sheath is molded is applied to the molding wheel after passing through an oscillating mechanism 13. Preformed rubber stock 14 is also advanced to the molding wheel 10, and is pressed into the molding cavity to form a sheath of the desired shape. The molded sheath 16 is withdrawn from the molding wheel and after being chilled by passing through device 17, is handled in a manner to be presently described.

To describe the machine in greater detail, molding wheel 10 has suitable journals or bearing blocks 21 for journaling the same on the main frame 22. The endless metal belt 11, which tracks upon a portion of the periphery of the molding wheel, also engages the pulley wheels 23, 24 and 25. Wheels 23 and 25 have fixed journals to the main frame, while wheel 24 is journaled upon the sliding bearing blocks 27. As suitable means for adjusting blocks 27, threaded rods 28 extend rearwardly from these blocks, and are engaged by nuts, which in turn are carried by the gear wheels 29. These gears are engaged by a common pinion 31 which in turn is operated by the hand wheel 32. Thus by turning this hand wheel the tension upon the endless belt 11 can be varied.

It will be noted that pulley wheels 23 and 25 are located so that the band contacts the periphery of wheel 10 over an arc of the order of 270°. This leaves a portion of the wheel available for introducing the rubber stock and the wire, and for removing the finished product.

The rim or peripheral portion 36 of the molding wheel is made so that it can be heated to a desired temperature, and so as to form one or more molded cavities or grooves of the desired contour. As shown in Figure 6 a series of parallel molding cavities can be formed by machining the main stock of the wheel to receive a series of rings 37, 38, 39 and 40. In the final assembly these rings can be permanently attached to the body of the wheel, as by welding, or they may be made replaceable by utilizing clamping screws 41 or like clamping devices for retaining the rings in place. The rings in this instance are proportioned to form a series of laterally spaced grooves or molding cavities 42, with a series of spaced teeth 43 within each cavity. (Figures 9, 10.) It is desirable to have the teeth connected by shallow rib 44, and to have the ends of the teeth grooved as indicated at 45 to seat the wire 12.

Heating of the rim may be by use of electrical elements but in this instance it is carried out by steam. Thus the rim of the wheel is shown provided with a steam chamber or cavity 46 (Figure 6) which is connected at spaced points with radial steam tubes or pipes 47. These pipes connect with the hub 48 and duct 50 of the wheel and communicate with the steam supply pipe 49. This pipe can connect to a suitable source of steam through a pressure regulator 51. The steam chamber in the wheel is also connected with condensate exhaust pipes 52 which lead to the opposite end of the wheel hub 48, whereby condensate is discharged through the hub duct 53. (Figure 6.) In order to control removal of the condensate at periodic intervals, each pipe 52 is provided with a valve 54 having an operating stem 56 adapted to be depressed to permit flow of condensate. Mounted upon a lever 55 there is a cam wheel 57 (Figure 6a) located within the path of movement of operating stem 56, so that as the valves pass this wheel they are momentarily operated to permit discharge of condensate. Each valve is operated when its associated pipe connects with a portion of the wheel rim which is lowermost. Lever 55 is pivotally attached to a bearing block 21 of the frame and can be adjusted by screw 58.

The drive means for the main molding wheel and the associated pulley wheel can vary in construction, but preferably it is capable of operating at two speeds. The drive means illustrated employs two electric motors 59 and 60. Motor 59 has a belt drive to shaft 61, which extends from the speed reduction gearing 62. Pinion 63 of this gearing engages a gear 64 which is attached to the shaft of the molding wheel 10. Motor 60 is belted to a separate speed reduction gearing 66, which has a shaft 67 aligned with shaft 61, and adapted to be connected to the same by the manual releasable clutch 68. Motor 59 and its associated drive elements can be adapted to drive the molding wheel at a speed suitable for use in setting up the machine such as about ¼ revolution per minute, and motor 60 can be used to secure an operating speed such as about 0.1 revolution per minute. When using motor 60, motor 59 has its belt drive disconnected, and clutch 68 is engaged.

During the molding operation wire 12 must be accurately seated upon the ends of the teeth 43 substantially as shown in Figures 9 and 10. Generally the wire is of substantial dimensions, such as for example from ¼ to ⅜ of an inch in diameter, and therefore it is relatively stiff and resists bending. It has been found difficult to feed the wire to the molding cavity in such a manner that its proper seating upon the end teeth 43 is insured at all times. Oscillating device 13 provides novel means for solving this problem, and it functions by continually oscillating the wire 12 laterally as it is advanced under tension into the molding cavity. The particular oscillating means illustrated consists of a roller 71 provided with grooves 72, to accommodate the wires 12. This roller is rotatably mounted upon a shaft, the ends of which have pivotal connections 73 with the oscillating arms 74, 76. The upper ends of these arms are cross connected by links 77. The lower ends have pivotal connection 78 with a bracket 79, which in turn is attached to the frame of the machine. Arm 74 has a lateral extension 81 which is attached to the upper end of a rod 82. The lower end of rod 82 has a pivotal connection 83 with the lever 84 (Figure 1b). One end of this lever has a pivotal mounting 86 to the frame of the machine, and the other end has a pivotal connection 87 with the link 88. The lower end of link 88 is journaled to a crank arm 89, driven at a proper rate by the motor 91. While the rate of oscillation can vary, in practice good results have been secured with about 2 to 4 oscillations per minute with the molding wheel rotating at about 0.1 R. P. M. As shown in Figures 1b and 3 the wire 12 is applied to the machine under tension, and is caused to pass under roll 71 in engagement with one of the grooves 72. The amplitude of oscillations can likewise vary, but in practice good results have been secured with an amplitude of about 2 inches, where the roller 71 is located about 20 inches from the region where the wire is engaging the teeth 43. This arrangement is suitable for wire ranging from say ¼ to ⅜ of an inch in diameter. With respect to the speed of rotation of the molding wheel (which in the foregoing example was about 0.1 revolution per minute), it should be correlated with the oscillating movement so that after the wire contacts a tooth it is given more than one complete oscillation before it is caused to contact a succeeding tooth. Thus as the wire approaches and is seating upon a tooth 43 it has slight oscillating movement in a lateral direction, which thereby insures proper and accurate seating upon the curved or concave surfaces 45.

Wire 12 is preferably an endless loop and is reused in successive molding operations. As previously mentioned the finished sheath 16 is caused to pass through chilling means 17 to be presently described, after which it passes eventually to a slitting mechanism 93, which cuts the sheath along its back side as will be presently described, whereby the sheath can be stripped from the inner wire. Thereafter the wire is looped over the idler pulley 94, and then returned to the machine. This arrangement not only serves to permit reuse of an endless loop or wire, but in addition it maintains a proper tension upon the wire being fed to the molding wheel.

The rubber stock supplied to the machine is preferably preformed to facilitate its application to the molding cavity. A suitable shaping is illustrated in Figures 15 and 16. Briefly it is an elongated body generally rectangular in cross sectional contour, with a continuous groove 96 extending through one side, the groove being located between the side portions 97. A considerable length of this rubber stock can be kept upon a suitable reel, and is fed to the machine over the top of the pulley wheel 23 (Figure 7). In order to properly locate the rubber stock upon the periphery of the wheel 23, an arcuate supporting bracket 101 is provided and attached to this bracket are the spacing and guide pins 102. The rubber stock is caused to pass between successive pairs of guide pins whereby it is located in the same vertical plane as its corresponding molding cavity.

Special means shown in Figures 4 and 5 is utilized for urging or crowding the rubber stock into the molding cavity. This means makes use of a plurality of spaced parallel fingers 106, which are carried by the fixed bracket bar 107, and which are adapted to be positioned between adjacent lengths of rubber stock. Pivot pins or shafts 108, 109 and 110 extend through these fingers and serve to journal a series of special wheels and rollers. Thus each shaft 108 and 110 carries wheels 111 and the smaller rollers 112. Pin 109 carries the rollers 113. The grouping of these wheels and rollers can be seen from Figure 4, and is the same for the space between each pair of fingers 106. Thus each wheel 111 is located between a pair of rollers 112, and rollers 113 are aligned with the rollers 112. All of the small rollers are provided with grooved peripheries. Wheels 111 are formed to extend within the groove 96 of the rubber stock. Rollers 112, 113 engage the end faces of the stock portions 97, and together with wheels 111 they press the stock against the endless metal band 11, which at that time is interposed between the rubber stock and the periphery of wheel 23. As a result, the stock is urged or crowded toward the molding cavity in the direction of its length, due to the fact that the velocity of the surface of belt 11, in the zone where the rubber stock is crowded against the same, is slightly greater than the rate with which the stock can be supplied to the cavity, thus causing a slight slippage.

The chilling means 17 is preferably of a type which discharges a spray of water upon the sheath. Thus this chilling means can consist of an open ended box 116 through which the sheath is caused to pass, and within which there is a water spray pipe 117, connected to the water supply hose 118. On the lower side of the hood 116 there is a collecting pan 119 connected to the drain pipe 121. Within the hood are one or more laterally extending shafts 122, carrying the rollers 123, upon which the sheath rests. The entire chilling device can be suitably supported by the stationary bracket 124. Upon leaving the chilling device 17 the sheath can pass and rest upon a lateral rod 126 carried by the stationary support arms 127.

The suitable slitting means 93 illustrated (Figure 1c) consists of a flanged roller 128 (Figure 14) journaled to a supporting frame 129. The base of this frame carries the vertical side guide rollers 131, and also laterally extending guide rollers 132. Between rollers 132 there is a thin vertical cutting blade 133 carried by the mounting block 134. This blade can be adjusted vertically by set screw 136. As shown in Figure 1c the finished sheath is caused to pass underneath roller 128, over rollers 132, and between the guide rollers 131. As it passes through the device in this manner the upper end of blade 133 slits the lower side of the sheath to the depth of the inner wire, along a plane accurately located midway between the sides. Thereafter the sheath can be removed as shown in Figure 1c, thus leaving the wire 12 free for continuing to the pulley 94.

Figures 11 and 12 illustrate a typical finished sheath. It has an accurately located passage extending longitudinally of the same, which is adapted to receive a trolley wire or cable 141. The back side of the sheath is slit as indicated at 142, whereby the sheath can be distorted for application to a trolley wire. After such application suitable clamping means can be applied to retain the slot 142 closed during normal use. The other side of the sheath is provided with regularly spaced recesses 143 separated by the gear-like teeth 144. The conducting teeth of a traveling contacting device are adapted to enter recesses 143 for the purpose of making electrical engagement with the trolley wire.

Operation of the machine as a whole can now be reviewed as follows: A rubber stock is selected formed substantially as illustrated in Figures 15 and 16, and of a material which will readily cure under heat and pressure to form a final resilient electrical insulation. In placing the machine in operation the molding wheel 10 and the associated pulley wheels together with the endless metal band 11, are driven at a suitable speed, and the rim of the molding wheel is heated to a suitable temperature for curing the rubber stock. The strip 14 of rubber stock is then fed into the machine from a reel or roll of the material as previously mentioned, and over the pulley wheel 23 upon the belt 11. Shortly before the rubber stock enters the molding cavity it is crowded against the adjacent surface of the belt 11, and as previously described this causes the stock to be urged or crowded towards the molding cavity. Due to such crowding of the rubber stock, and likewise to application of the metal band, the rubber stock as finally positioned within the molding cavity is under considerable pressure to thereby cause it to flow into all parts of the cavity. When the rubber stock enters the molding cavity the wire 12 is already in place upon the teeth 43, as has been previously described. As the rubber progresses with rotation of the molding wheel it is subjected to heat to cure the same and curing is completed by the time the finished product 16 is removed over the pulley 25 (Figure 1b). At this time the sheath is at an elevated temperature, and is subject to possible elongation with resulting inaccuracy in the spacing between the teeth 144. However, the sheath is immediately chilled by passing it through the chilling device 17, whereby it is set and no longer subjected to possible deformation. From the chilling device 17 the sheath passes to the slitting device 93, where the back side of the sheath is slit longitudinally and the sheath removed from the inner wire. The wire 12 passes over the pulley 94 and is returned continuously to the machine.

In most instances it is desirable to carry out the slitting operation as described above to remove the sheath from the inner wire. However in some instances it may be desired to permanently mold the sheath upon an inner wire, in which event the slitting operation is omitted, and the wire taken off the machine together with the sheath. When using the machine in this manner the wire must be supplied to the machine from a suitable source such as a roll or reel and with suitable tension. Such wire may be deformed to provide spurs or like surface deformations, to thereby aid bonding of the wire to the rubber.

In some instances it may be desirable to trim the sheath as it leaves the chilling device 17. This can be accomplished by devices known to those skilled in the art, as for example grinding wheels disposed whereby the sheath passes into contact with the same.

This application is a continuation-in-part of my copending application Serial Number 460,512, filed October 2, 1942, now abandoned, for Molding machine.

Reference is made to my two co-pending applications Serial No. 713,772, filed December 3, 1946; and Serial No. 713,773, filed December 3, 1946, now abandoned, both entitled "Molding machine," disclosing and claiming subject matter disclosed but not claimed herein. The subject matter disclosed but not claimed herein is disclosed and claimed in my co-pending application entitled "Molding machine and method," Serial No. 769,001, filed August 16, 1947, and filed on or about August 19, 1947.

I claim:

1. In a machine for continuously molding a material like rubber to form a sheath for a wire or cable, a molding wheel adapted to be rotated at a predetermined rate, the wheel being provided with a groove extending around its peripheral portion, means for feeding a wire to the groove as the wheel rotates, means within the groove for spacing the wire from the bottom, sides and outer edges of the groove, means for supplying a length of moldable material to the groove in conjunction with the wire, and means for applying a groove enclosing member to the periphery of the wheel to apply pressure to the moldable material during the molding operation.

2. In a machine for continuously molding a sheath of material like rubber to form a sheath for a wire or cable, a molding wheel adapted to be rotated at a predetermined speed, the outer periphery of the wheel being provided with a groove corresponding with the shape of the sheath to be molded, means for feeding a wire or cable into the peripheral groove of the wheel, spaced teeth constituting means for spacing the wire from the sides, bottom and outer edges of said groove, means for feeding a strip of moldable material into said groove in conjunction with the wire, and means for applying an enclosing member to the periphery of the wheel to press the moldable material into the groove during a molding operation.

3. In a machine for the continuous molding of a sheath of rubber or like material about a wire or cable, where the finished sheath is provided with a series of openings extending through one side of the same for making electrical connection with the cable, a molding wheel having a groove formed about its outer periphery, a series of spaced teeth mounted upon the molding wheel and located within the groove, the groove together with the teeth being shaped to conform with the final shaping of the sheath, means for rotating the wheel at a predetermined speed, means for feeding a length of cable into the groove with the cable resting upon the ends of the teeth, means for feeding a strip of moldable material into the groove in conjunction with the cable, and means for applying pressure to the moldable material as the wheel is rotated.

4. A machine as in claim 3 in which the ends of the teeth are grooved to receive the cable.

5. A machine as in claim 3 in which the means for applying pressure comprises a continuous metal band in conjunction with means for applying the band to the periphery of the wheel under tension.

6. In a machine for continuously molding a sheath of material like rubber about a wire or cable, where the finished sheath is provided with a series of spaced openings extending through one side of the sheath for making connection with the cable, a molding wheel adapted to be rotated at a predetermined rate, the peripheral portion of the molding wheel being provided with a groove extending entirely about its periphery, teeth mounted upon the wheel within the groove, the contouring of both the teeth and the groove corresponding to the contouring of the finished sheath desired, the outer ends of the teeth being grooved, means for feeding a length of cable into the groove and upon the outer ends of the teeth as the wheel rotates, means for continuously supplying a length of moldable material into the groove in conjunction with the cable, means for applying pressure to the material supplied to the groove as the wheel rotates, and means for supplying limited lateral oscillatory movement to the cable in a region near where the cable enters the groove, to assist in locating the cable upon the teeth.

7. A machine as in claim 6 plus means for supplying continuous tension to the cable being supplied to the wheel.

8. In a machine for continuously molding a material like rubber to form a sheath for a wire or cable, a molding wheel adapted to be rotated at a predetermined rate, the wheel being provided with a groove extending about its peripheral portion, means for feeding a wire to the groove as the wheel rotates, means within the groove for spacing the wire from the bottom, the sides and outer edges of the groove, means for supplying a length of moldable material to the groove in conjunction with the wire, means for applying a groove enclosing member to the periphery of the wheel to apply pressure to the moldable material during the molding operation, and means for chilling the molded sheath as it is removed from the wheel.

9. In a machine for continuously molding a material like rubber to form a sheath for a wire or cable, a molding wheel adapted to be rotated at a predetermined rate, the wheel being provided with a groove extending about its peripheral portion to form a molding cavity, an endless wire having one portion of the same disposed within said cavity and adapted to enter and leave the cavity as the wheel rotates, means for placing the remaining portion of said endless wire under tension, means within the groove for spacing the wire from the bottom, sides and outer edges of the groove, means for supplying a length of moldable material to the groove in conjunction with the wire, means for applying a groove enclosing member to the periphery of the molding wheel to apply pressure to the moldable material during the molding operation, and means for slitting the sheath longitudinally to enable its removal from the wire, as the finished sheath is removed from the wheel.

10. In a machine as defined in claim 9 in which said means for spacing the wire from the bottom, sides and outer edges of the groove comprises a series of spaced teeth whereby the finished sheath is provided with spaced recesses extending through one side of the same.

11. In a machine for continuously molding a material like rubber to form a sheath for a wire or cable, a molding wheel adapted to be rotated at a predetermined rate, the wheel being provided with a groove extending about its peripheral portion, to thereby form a molding cavity, means for feeding a wire to the cavity as the wheel rotates, means within the cavity for spacing the wire from the bottom, sides and outer edges of the groove, at least three pulleys associated with the molding wheel, one wheel having its periphery in close juxtaposition with the periphery of the molding wheel in a region adjacent the region where the wire is fed to the groove, means for supplying a length of moldable material to the groove in conjunction with the wire, and an endless band tracked over the pulleys and the molding wheel, the two other pulleys being so disposed and the endless band being so tracked that the band is pressed upon a major portion of the periphery of the molding wheel to apply pressure to the moldable material during the molding operation, and is caused to track over said one pulley and pass between the periphery of the same and the molding wheel, the two other pulleys serving to guide the endless band for removal from the molding wheel and for return to said one pulley.

BURTIS W. BENBOW.

REFERENCES CITED

The following references are of record in the file of this patent:

UNITED STATES PATENTS

| Number | Name | Date |
|---|---|---|
| 1,575,700 | Maranville et al. | Mar. 9, 1926 |
| 1,948,491 | Brockway | Feb. 27, 1934 |
| 2,303,554 | Humphreys | Dec. 1, 1942 |